United States Patent
Lin et al.

(10) Patent No.: US 10,269,187 B2
(45) Date of Patent: Apr. 23, 2019

(54) METHODS AND SYSTEMS FOR ASSESSING DAMAGE TO A STRUCTURE AND DETERMINING REPAIR INFORMATION

(71) Applicant: The Boeing Company, Chicago, IL (US)

(72) Inventors: John Lin, Chicago, IL (US); Cong Duong, Chicago, IL (US); Russell Keller, Chicago, IL (US); Arne Lewis, Chicago, IL (US); Nicolette Yovanof, Chicago, IL (US); Kelly Greene, Chicago, IL (US); Carlyn Brewer, Chicago, IL (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 15/339,372

(22) Filed: Oct. 31, 2016

(65) Prior Publication Data

US 2018/0118375 A1     May 3, 2018

(51) Int. Cl.
*B64F 5/00* (2017.01)
*G07C 5/00* (2006.01)
(Continued)

(52) U.S. Cl.
CPC ............ *G07C 5/006* (2013.01); *B64F 5/60* (2017.01); *G06Q 10/20* (2013.01)

(58) Field of Classification Search
CPC ............ G07C 5/006; G06Q 10/20; B64F 5/60
(Continued)

(56) References Cited

U.S. PATENT DOCUMENTS

2012/0143365 A1   6/2012   McIver et al.
2013/0311111 A1   11/2012   Lewis et al.

FOREIGN PATENT DOCUMENTS

EP    2 607 239     6/2013
EP    2607239 A2 *   6/2013   ................ B64F 5/60

OTHER PUBLICATIONS

Extended European Search Report prepared by the European Patent Office in application serial No. EP 17 18 7376, dated Oct. 26, 2017.

* cited by examiner

*Primary Examiner* — Brian P Sweeney
(74) *Attorney, Agent, or Firm* — McDonnell Boehnen Hulbert & Berghoff LLP

(57) ABSTRACT

An example computer-implemented method of assessing damage to a structure includes receiving information of damage to the structure, and identifying a damage type for the damage. Following, the damage type and the information is compared with a first reference having allowable damage limits of the structure for that damage type, a second reference having damage repair information and associated damage repair processes, and a database having historical repair information for the damage type. Based on the damage type and the information indicating that the damage is outside the allowable damage limits described in the first reference and also does not have any associated damage repair process described in the second reference and the database does not include historical repair information for the damage type, expanded repair information is provided for a repair solution based on a material type and loading of the structure.

20 Claims, 9 Drawing Sheets

(51) Int. Cl.
*G06Q 10/00* (2012.01)
*B64F 5/60* (2017.01)
(58) Field of Classification Search
USPC .......................................... 701/31.6
See application file for complete search history.

METHODS AND SYSTEMS FOR ASSESSING DAMAGE TO A STRUCTURE AND DETERMINING REPAIR INFORMATION

FIELD

The present disclosure relates generally to operation models and processes for providing efficient service engineering support to airlines and maintenance, repair, and overhaul (MRO), and more particularly to methods for determining initial disposition of damage to a structure and associated repair procedures when needed.

BACKGROUND

Management of maintenance and reworking of valuable equipment, such as vehicles and more particularly aircraft, can be time intensive and expensive. In the case of commercial aircraft, time during which an aircraft is not in service might result in substantial lost revenue as well as storage and maintenance fees. Thus, some commercial aircraft companies may place a premium on correctly performing maintenance or reworking of aircraft as quickly as possible. Any maintenance or reworking to be performed should meet or exceed all requirements or goals.

Maintenance of aircraft structure relies on a structural repair manual. It is time consuming for technicians to locate, within the manual, allowable damage limits (ADL) and associated repair procedures for any damage to an aircraft. A lack of adaptable and generic analysis tools can cause longer turnaround time for responding to service requests. As a result, some current service engineering support processes may be inefficient and complex.

Long service interruptions and high reworking or maintenance costs are undesirable. Accordingly, it would be advantageous to have a method and apparatus that takes into account one or more of the issues discussed above, such as increasing the speed of rework determination processes while complying with or exceeding all standards, regulations, and/or airworthiness requirements, as well as possibly other issues.

SUMMARY

In one example, a computer-implemented method of assessing damage to a structure is described. The method comprises receiving information of damage to the structure, identifying a damage type for the damage, comparing the damage type and the information with a first reference having allowable damage limits of the structure for that damage type, a second reference having damage repair information and associated damage repair processes, and a database having historical repair information for the damage type, and based on the damage type and the information indicating that the damage is outside the allowable damage limits described in the first reference and also does not have any associated damage repair process described in the second reference and the database does not include historical repair information for the damage type, providing for display expanded repair information for a repair solution based on a material type and loading of the structure.

In another example, a computer-implemented method of assessing damage to a structure is described. The method comprise receiving information of damage to the structure, identifying a damage type for the damage, comparing the damage type to one or more reference manuals having associated repair information and to a database having historical repair information for the damage type to determine an appropriate repair process, and based on a lack of the appropriate repair process being found in the one or more reference manuals having associated repair information and the database having historical repair information for the damage type, determining expanded repair information for a repair solution based on a material type and loading of the structure.

In another example, a system is described comprising one or more processors, and non-transitory data storage storing instructions, that when executed by the one or more processors, causes the one or more processors to perform functions. The functions comprise receiving information of damage to the structure, identifying a damage type for the damage, comparing the damage type and the information with a first reference having allowable damage limits of the structure for that damage type, a second reference having damage repair information and associated damage repair processes, and a database having historical repair information for the damage type, and based on the damage type and the information indicating that the damage is outside the allowable damage limits described in the first reference and also does not have any associated damage repair process described in the second reference and the database does not include historical repair information for the damage type, providing for display expanded repair information for a repair solution based on a material type and loading of the structure.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Figure 1:
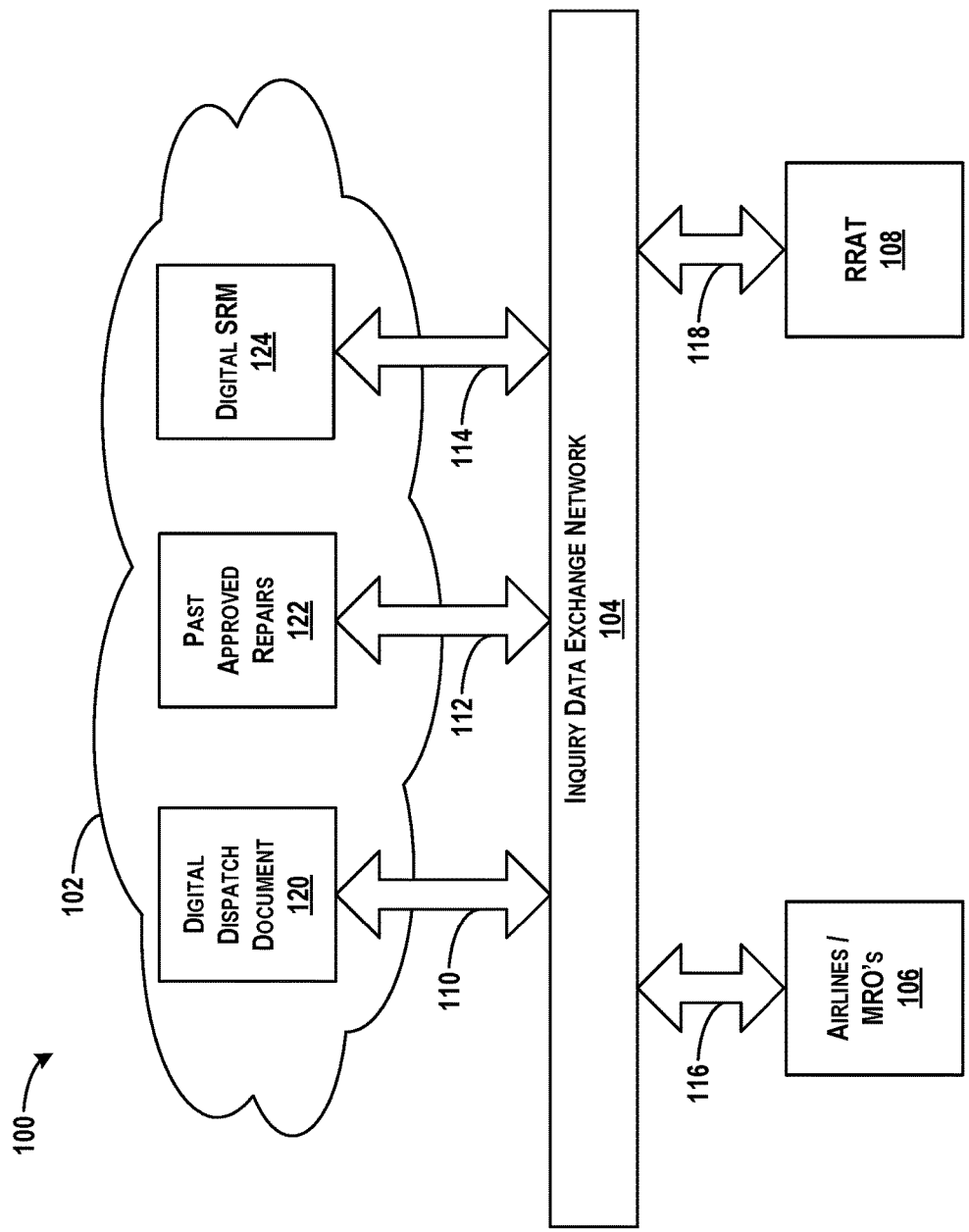
FIG. 1 is a block diagram of an arrangement for providing damage assessment and repair information is illustrated, according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples herein, new operation models and processes for providing more efficient service engineering support to airlines and maintenance, repair, and overhaul (MRO) are described. A process of repairing damaged aircraft requires an initial disposition of the damage. The disposition involves comparing the damage type and damage information to a variety of reference manuals and historical repair information. An example aircraft damage and repair disposition tool includes structural repair manuals (SRM), which can be time consuming to review and locate allowable damage limits (ADL) and associated repair procedures. This leads to longer turnaround times for responding to service requests. Further, test-based approaches and gaps in analysis capabilities for expanding ADL and repairable damage limits (RDL) can be costly and time consuming. Such gaps include gaps within an original equipment manufacturer's (OEM) test database and associated analytical methods that would allow expansion of the ADL (i.e., no repair would be required). As such, the initial disposition process can cause a delay for the damage repair, and may require more time than performing the actual repair of the damage.

Examples described herein provide digitization of SRMs and other aircraft dispatch authorization documents for a Rapid Repair Analysis Tool (RRAT) as an engine for providing substantiated damage assessment and repair decisions within a shortened time window. This may provide a large time saving for a typical service request response and can be provided as a web-based application for airlines and MRO's to access on a subscription or pay-per-use basis, for example.

The damage assessment and repair decisions can be shortened by comparing a damage type and damage information (e.g., damage geometry) against a variety of references to determine an appropriate damage repair. The damage type and damage information is received from a user interface as input by a user, and is used to query the ADLs for the damage type to identify any standard repair for the damage. If repair information for the damage type is available in these sources, the repair information (if any is needed) is provided to the user along with mandated FAA documentation for the repair. If the information for the damage type is not available in those sources, a database of historical repairs is queried to determine whether the damage type has been previously encountered and solved. When the database of historical repairs does not contain corresponding repair information, repair information can be expanded for a repair solution based on a material type and loading of the damaged structure. In all instances, FAA mandated documentation is created and provided for the user.

Referring now to FIG. 1, a block diagram of an arrangement 100 for providing damage assessment and repair information is illustrated, according to an example embodiment. The arrangement 100 includes a cloud 102 coupled through an inquiry data exchange network 104 to airlines maintenance, repair, and overhaul (MRO's) 106 and a rapid repair analysis tool (RRAT) 108.

The cloud 102 generally refers to networked computer architectures in which application execution and storage may be divided, to some extent, between client and server devices. The cloud 102 may refer to a service or a group of services accessible over the inquiry data exchange network 104 (e.g., Internet) by client and server devices, for example. The cloud 102 can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a user of a client device accessing a cloud-based application may not be aware that the client device downloads program logic and/or data from the server devices, or that the client device offloads processing or storage functions to the server devices, for example.

As such, computing on the cloud 102 can include provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

In FIG. 1, communication links 110, 112, and 114 between components of the cloud 102 and the inquiry data exchange network 104, and communication links 116 and 118 between the inquiry data exchange network 104 and the airlines MRO's 106 and the RRAT 108 may include wired connections, such as a serial or parallel bus, or may also be wireless links that may include Bluetooth, IEEE 802.11 (IEEE 802.11 may refer to IEEE 802.11-2007, IEEE 802.11n-2009, or any other IEEE 802.11 revision), or other wireless based communication links. As such, the airlines MRO's 106 and the RRAT 108 may include a wired or wireless network interface through communication with the cloud 102 can occur.

The cloud 102 provides a central, searchable depository of digitized structure damage disposition authorization, such as for aircraft or other vehicles, and access to such information can be controlled. The cloud 102 includes digital dispatch documentation 120, past approved repairs 122, and a digital structural repair manual (SRM) 124. The digital dispatch documentation 120, the past approved repairs 122, and the digital structural repair manual (SRM) 124 may be stored in a database in the cloud 102, or in separate databases in the cloud 102, or more generally within data storage residing in or accessible by the cloud 102.

The digital dispatch documentation 120 includes authority documents required to authorize a repair to damage to certain structures, such as to aircraft. Example documentation includes Federal Aviation Authority (FAA) approved repair documents.

The past approved repairs 122 include information as to historical data and details of past damage observed to certain structures, and pre-run solutions for a repair procedure that has been authorized to be performed. The past approved repairs 122 may include details of prior damage observed including a size of the damage, a location of the damage on the structure, and any other details relevant to the damage. The past approved repairs 122 may also include past maintenance actions beyond repairs, such as modifications or service bulletins for the damaged area being evaluated.

The digital SRM 124 receives damage inputs from aircraft parts navigation and damage mapping applications and outputs associated damage dispositions and necessary repair processes. The digital SRM 124 also includes baseline and updated approved ADLs and RDls as well as the associated repair procedures. The digital SRM 124 is a digital platform that may be specific to certain structures, such as certain aircraft, or can include information for repairs to an entire fleet of aircraft or structures.

The inquiry data exchange network 104 may include the Internet or any other type of network enabling communication between the cloud 102 and the airlines MRO's 106 and the RRAT 108. Example networks include a local area network (LAN) or wide area network (WAN).

The airlines MRO's 106 include service groups that maintain and service aircraft. The airlines MRO's 106 may observe damage in the field and access the digital dispatch document 120, the past approved repairs 122, and the digital SRM 124 to determine an appropriate approved repair procedure to perform.

The RRAT 108 may update the digital SRM 124 with new data for new aircraft to handle more damage cases. The RRAT 108 helps to improve aircraft damage disposition in terms of ADL/RDL expansion and documentation efficiency.

In many industries, such as the aircraft industry, aging vehicles will require more maintenance, and as new technologies are developed, (such as composites), new repair procedures will be needed (e.g., bonded repairs). The repair disposition process generally has a limited time window, since any repair time of an airplane keeps the airplane grounded and out of service. It is desired to complete a repair as quickly as possible (within about 8 hours is a good goal, as some repair goals may be within 1-3 hours, some within 8-12 hours, and other larger/structural repairs may be 3-5 days), and the repairs need to be completed and meet FAA compliance. However, some repair dispositions can be up to 4-28 days in length. Example repairs for aircraft include fixing dents, scratches, holes, punctures, cracks, delamination, or other damage types.

Repairs can occur in-service that reduces aircraft availability; using the digital SRM 124 identifies allowable and repairable damage limits (ADL/RDL) quickly. The arrangement 100 shown in FIG. 1 enables a web-based toolset to integrate damage assessment, repair substantiation and FAA approval in an easily accessible format to reduce the repair disposition time.

Figure 2:
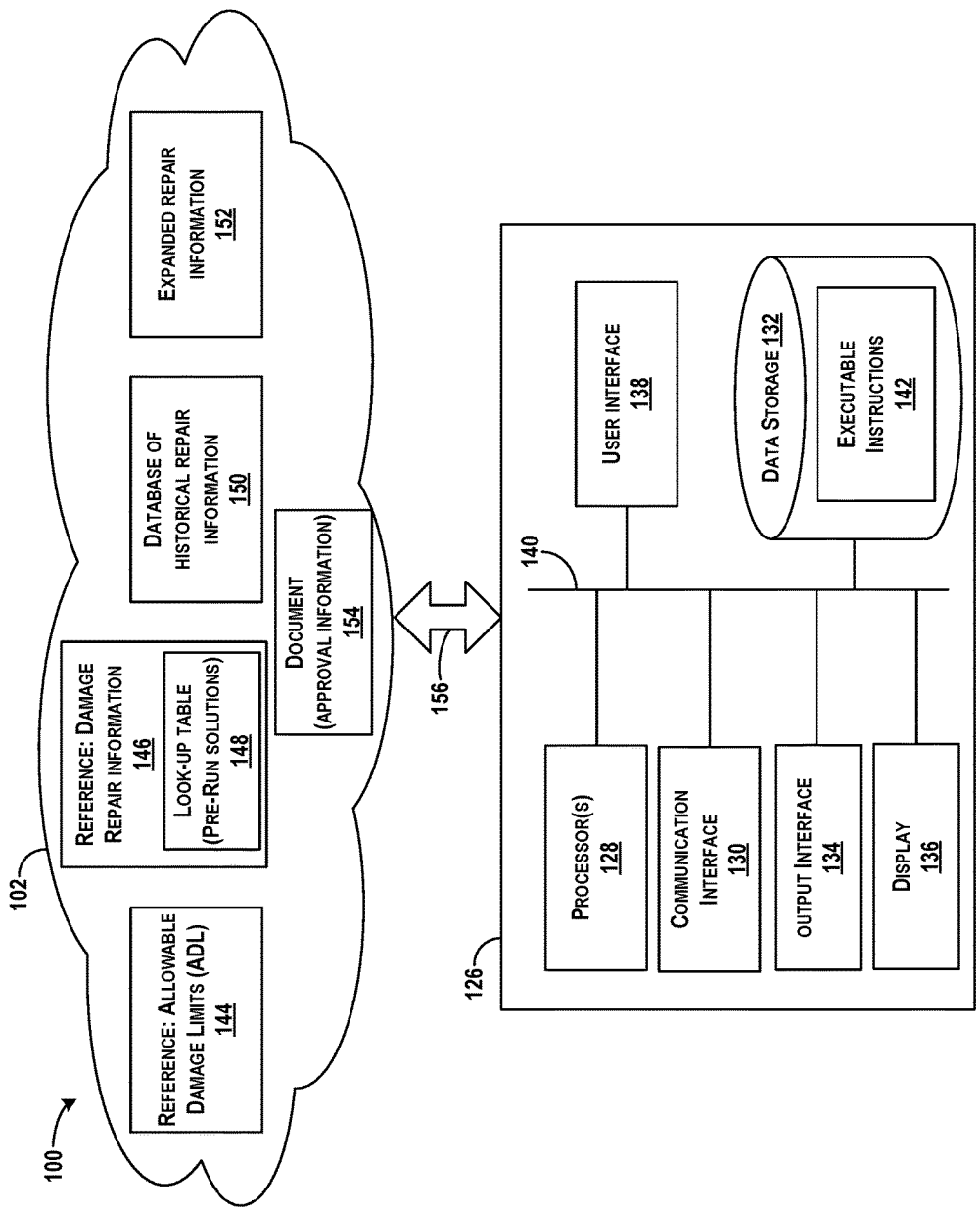
FIG. 2 illustrates another block diagram of the arrangement including the cloud communicatively connected to a system according to an example embodiment.

FIG. 2 illustrates another block diagram of the arrangement 100 including the cloud 102 communicatively connected to a system 126, according to an example embodiment. The system 126 includes one or more processor(s) 128, a communication interface 130, data storage 132, an output interface 134, a display 136, and a user interface 138 each connected to a communication bus 140. The system 126 may also include hardware to enable communication within the system 126 and between the system 126 and other devices (not shown). The hardware may include transmitters, receivers, and antennas, for example.

The communication interface 130 may be a wireless interface and/or one or more wireline interfaces that allow for both short-range communication and long-range communication to one or more networks or to one or more remote devices. Such wireless interfaces may provide for communication under one or more wireless communication protocols, such as Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 130 may be configured to receive input data from one or more devices, and may also be configured to send output data to other devices.

The data storage 132 may include or take the form of one or more computer-readable storage media that can be read or accessed by the processor(s) 128. The computer-readable storage media can include volatile and/or non-volatile storage components, such as optical, magnetic, organic or other memory or disc storage, which can be integrated in whole or in part with the processor(s) 128. The data storage 132 is considered non-transitory computer readable media. In some embodiments, the data storage 132 can be implemented using a single physical device (e.g., one optical, magnetic, organic or other memory or disc storage unit), while in other embodiments, the data storage 132 can be implemented using two or more physical devices.

The data storage 132 thus is a non-transitory computer readable storage medium, and executable instructions 142 are stored thereon. The instructions 142 include computer executable code. When the instructions 142 are executed by the processor(s) 128, the processor(s) 128 are caused to perform functions. Such functions are described below.

The processor(s) 128 may be a general-purpose processor or a special purpose processor (e.g., digital signal processors, application specific integrated circuits, etc.). The processor(s) 128 may receive inputs from the communication interface 130, and process the inputs to generate outputs that are stored in the data storage 132 and output to the display 136. The processor(s) 128 can be configured to execute the executable instructions 142 (e.g., computer-readable program instructions) that are stored in the data storage 132 and are executable to provide the functionality of the system 126 described herein.

The output interface 134 outputs information to the display 136 or to other components as well. Thus, the output interface 134 may be similar to the communication interface 130 and can be a wireless interface (e.g., transmitter) or a wired interface as well.

The system 126 may be a computing device of various forms, and can be included within a number of different computing devices or servers, for example. In addition, components of the system 126 can be separate from the system 126 in some examples, such as the display 136 being a separate component.

In FIG. 2, the cloud 102 is shown to include a reference having allowable damage limits (ADL) 144, a reference having damage repair information 146, a database having historical repair information 150, expanded repair information 152, and document (approval information) 154. Each of these may be stored in separate servers, storage mediums, databases, etc. in the cloud 102, and accessible by the system 126 through a communication link 156.

The reference having allowable damage limits (ADL) 144 includes information of a structure or number of structures, and ADL for damage types to the structure. In one example, a structure may include a piece of an aircraft, and a damage type may include a dent. For some pieces of the aircraft, dents can be allowable and cause no harm, and thus, when the dent is of a certain size and is present on a certain location of the structure, the dent may be allowable, and no repair is needed. Such ADLs are included in the reference having ADLs 144, and the information in the reference having ADLs 144 can be presented as a lookup table associating a structure, location on the structure, damage type, damage information (e.g., size, severity, etc.) and whether such damage is allowable, for example. Thus, the reference having ADLs can be accessed to determine that the damage type requires no repair, no substantial repair, or possibly only a cosmetic repair such as a paint touch-up.

The reference having damage repair information 146 including information as to certain damages types that will require a repair and are within a repairable damage limit (RDL), and thus, an associated predefined repair procedure is known. The reference having damage repair information 146 includes a look-up table 148 of pre-run solutions for the damage type to a structure and known repair solutions.

The database having historical repair information 150 including information as to known damage types and information incurred to a structure, and known repair solutions that can be applied. Here, example damage types may not be those as included in the reference having damage repair information 146, but rather include less often incurred damage, or damage types for which there is not a known pre-run solution for repair. However, the database having historical repair information 150 stores prior repair solutions that have been used and approved for specific or unique damage types. The database having historical repair information 150 includes repair solutions that can be further evaluated, and possibly incorporated into the reference having damage repair information 146 in the future once the repair solution is further evaluated and optimized.

The expanded repair information 152 includes information that can be determined in real time for any damage type that is a non-SRM damage type and for damage types that are outside of ADLs and RDLs. Thus, for damage types for which a repair is needed, but there is no pre-run solution known or available, the expanded repair information 152 is accessed. Here, the damage to the structure is analyzed under a real situation and actual damage specific to the structure is considered, in contrast to using limits set due to standardized testing for ADLs and RDLs. The actual damage area is analyzed, and the expanded repair information 152 can provide a workable repair solution. More details for selecting and determining the expanded repair solution are provided below. However, in some examples, the expanded repair information 152 is determined, based in part, by access to the reference having damage repair information 146 and the database of historical repair information 150.

The document (approval information) 154 includes federal aviation administration (FAA) documentation that approves the repair procedure output to the system 126. The system 126 can be provided a copy of the document or access to a document having approval information for the repair information (e.g., a hyperlink).

Within examples, the processor(s) 128 of the system 126 can execute the executable instructions 142 stored in the data storage 132 to perform functions of assessing damage to a structure. The processor(s) 128 receive information of damage to the structure from the user interface 138, and identify a damage type for the damage. Following, the processor(s) 128 compare the damage type and the information with a first reference having allowable damage limits of the structure for that damage type (e.g., the reference having ADL 144), a second reference having damage repair information and associated damage repair processes (e.g., the reference having damage repair information 146), and the database having historical repair information 150 for the damage type. Based on the damage type and the information indicating that the damage is outside the allowable damage limits described in the first reference and also does not have any associated damage repair process described in the second reference and the database does not include historical repair information for the damage type, the processor(s) provide for the display 136 expanded repair information for a repair solution based on a material type and loading of the structure.

The communication interface 130 enables a subscription to the system 126 and to receive the information of damage to the structure from an authorized subscriber. In this manner, the repair information can be offered online to subscribers, such that a non-SRM repair process can be determined and provided automatically, along with FAA documentation, so that a repair can be performed efficiently and quickly. The non-SRM repair process is specific to consider individual specific part that are damaged, and is further specific to the loading and configuration of the structure.

Figure 3:
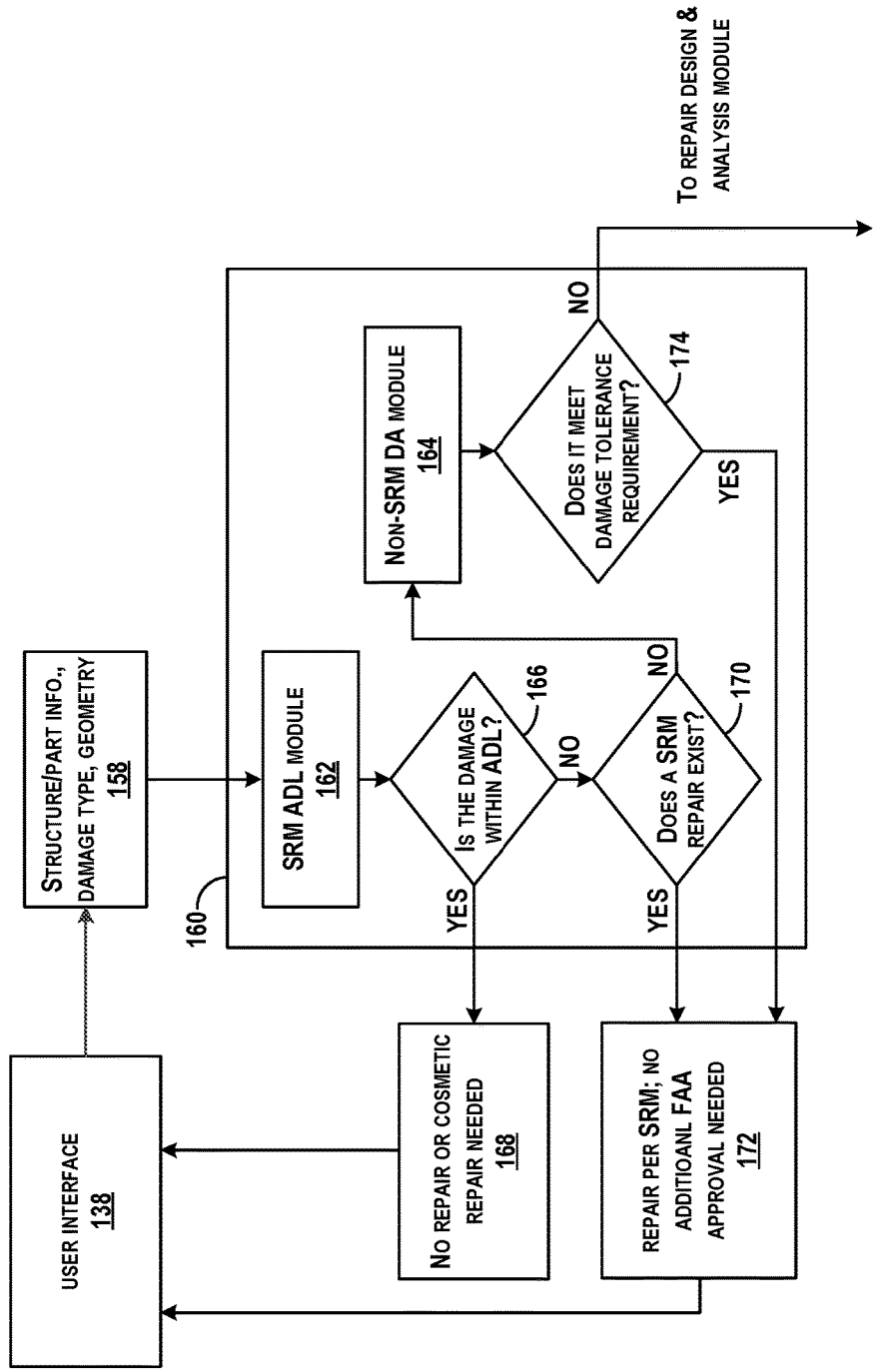
FIG. 3 is a flow diagram of functions performed by the system according to an example embodiment.

FIG. 3 is a flow diagram of functions performed by the system 126, according to an example embodiment. Initially, a user inputs the required information for the affected airplane as well as the damage information into the user interface 138, which outputs structure/part information, damage type, geometry of damage, etc. 158 to a damage assessment module 160, which includes an SRM ADL module 162 and a non-SRM damage assessment (DA) module 164. The damage assessment module 160, the SRM ADL module 162, and the non-SRM DA module 164 includes functions that can be performed by the processor(s) 128 executing the executable instructions 142 stored in the data storage 132.

The information output by the user interface 138 can include airplane model number, component module numbers, damage area zones or other information that may be input to a graphical user interface (GUI) by selecting areas/types/defect sizes of the damage.

The SRM ADL module 162 receives the damage type information and determines if the damage type is within the ADL, as shown at block 166. This may be accomplished by accessing the reference having ADLs 144 in the cloud 102. If the damage type is within the ADL, the damage is allowed, and no repair or only a cosmetic repair is needed, as shown at block 168.

If not, the SRM ADL module 162 determines if an SRM repair exists, as shown at block 170. This may be accomplished by accessing the reference having damage repair information 146. If an SRM repair exists, information of the repair per the SRM is output and no additional FAA approval is needed since a pre-run solution is known, as shown at block 172.

If an SRM repair does not exist, then the non-SRM DA module 164 processes the damage input. Initially, the non-SRM DA module 164 determines if the allowed damages meet damage tolerance requirements, as shown at block 174. If so, a repair per the SRM is provided at block 172. For example, if damage such as a hail strike creates damage more than allowed, the non-SRM module 164 can use the pre-run solutions when tolerances can be met. Otherwise, the non-SRM DA module 164 determines that a substantial repair is needed on a damage type for which a pre-run solution is unknown, and so a repair design and analysis module 176 is accessed.

Figure 4:
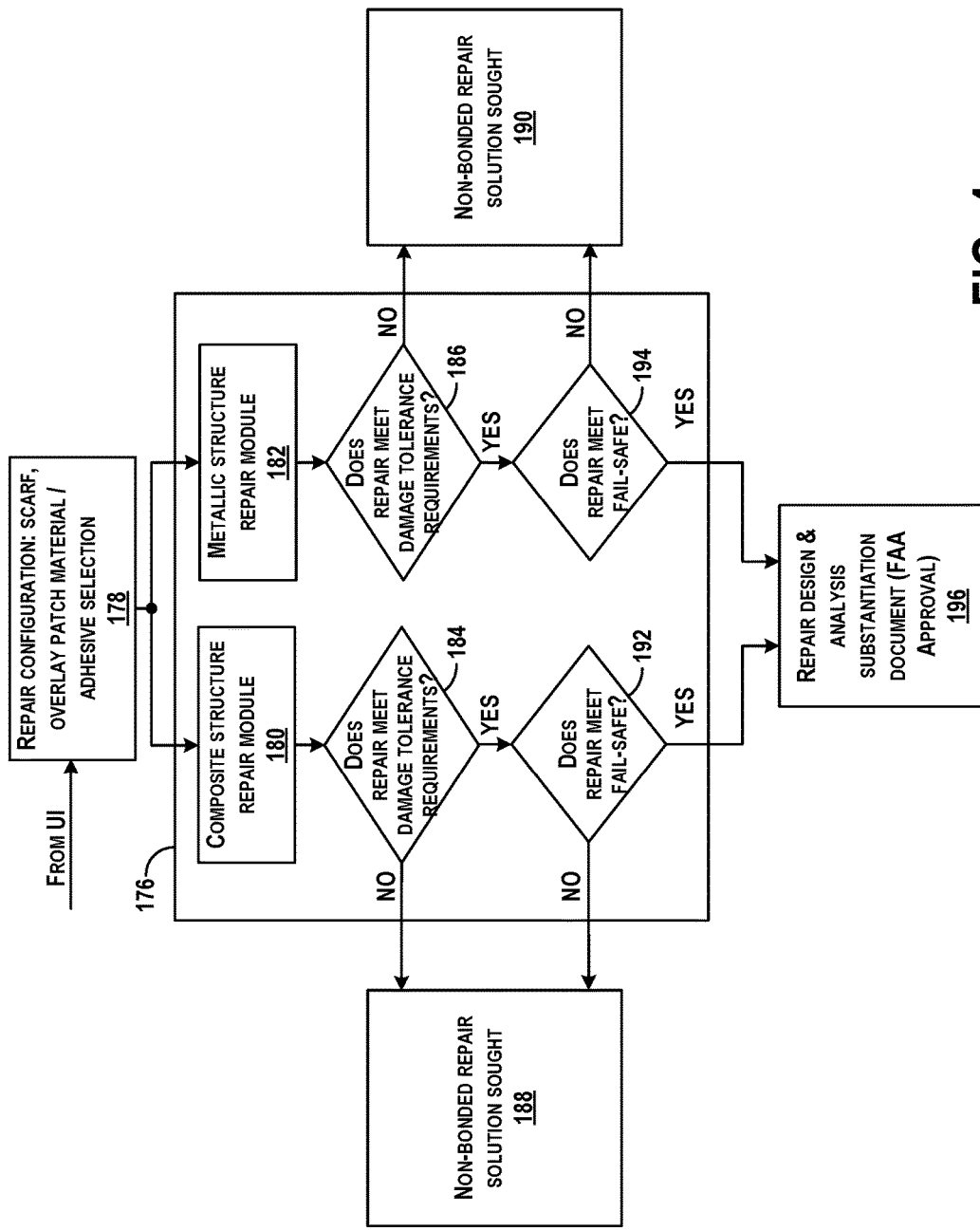
FIG. 4 is a flow diagram of additional functions performed by the system for the repair design and analysis module, according to an example embodiment.

FIG. 4 is a flow diagram of additional functions performed by the system 126 for the repair design and analysis module 176, according to an example embodiment. The repair design and analysis module 176 includes functions that can be performed by the processor(s) 128 executing the executable instructions 142 stored in the data storage 132.

The information received from the user interface 138 about the damage situation is loaded into the repair design and analysis module 176. Additional details may be included such as a repair configuration for the damage type 178, e.g., a scarf joint, an overlay patch material to use, an adhesive selection, etc. The repair design and analysis module 176 may analyze the damage situation for all types of repairs or may ask the user for which repair solution is desired, and then the user makes a selection. The repair design and analysis module 176 may also prompt the user to enter information as to appropriate materials on hand for a repair. The repair design and analysis module 176 then analyzes the information to determine a type of material of the structure. For a composite structure, a composite structure repair module 180 is accessed, and for a metallic structure, a metallic structure repair module 182 is accessed. The composite structure repair module 180 and the metallic structure repair module 182 include functions that can be performed by the processor(s) 128 executing the executable instructions 142 stored in the data storage 132. For each of the composite structure repair module 180 and the metallic structure repair module 182, initially, it is determined if a repair can be performed to meet damage tolerance requirements, as shown at blocks 184 and 186. If not, no bonded repair solution can be performed, as shown at blocks 188 and 190. If yes, then it is determined if the repair meets fail-safe requirements, as shown at blocks 192 and 194. If not, then again no bonded repair solution can be performed and a non-bonded repair solution will be sought, as shown at blocks 188 and 190. If yes, then repair design and analysis substantiation documents 196 are provided. For example, the FAA approval forms are populated and provided for signature, and a package is returned to the user to perform the repairs.

The repair design and analysis module 176 is programmed to determine a bonded repair solution to any damage type. Bonded repairs are only available for damages that are within certain tolerances, such as within certain size limits. Otherwise, the structure or part may need to be replaced entirely if the damage size is too large for a bonded repair. Further, bonded repair solutions are only available in certain instances so as to meet fail-safe requirements. For example, a bonded repair may not be used on some structures that are exposed to high heat or high temperatures, since the bonded repair may fail.

Figure 5:
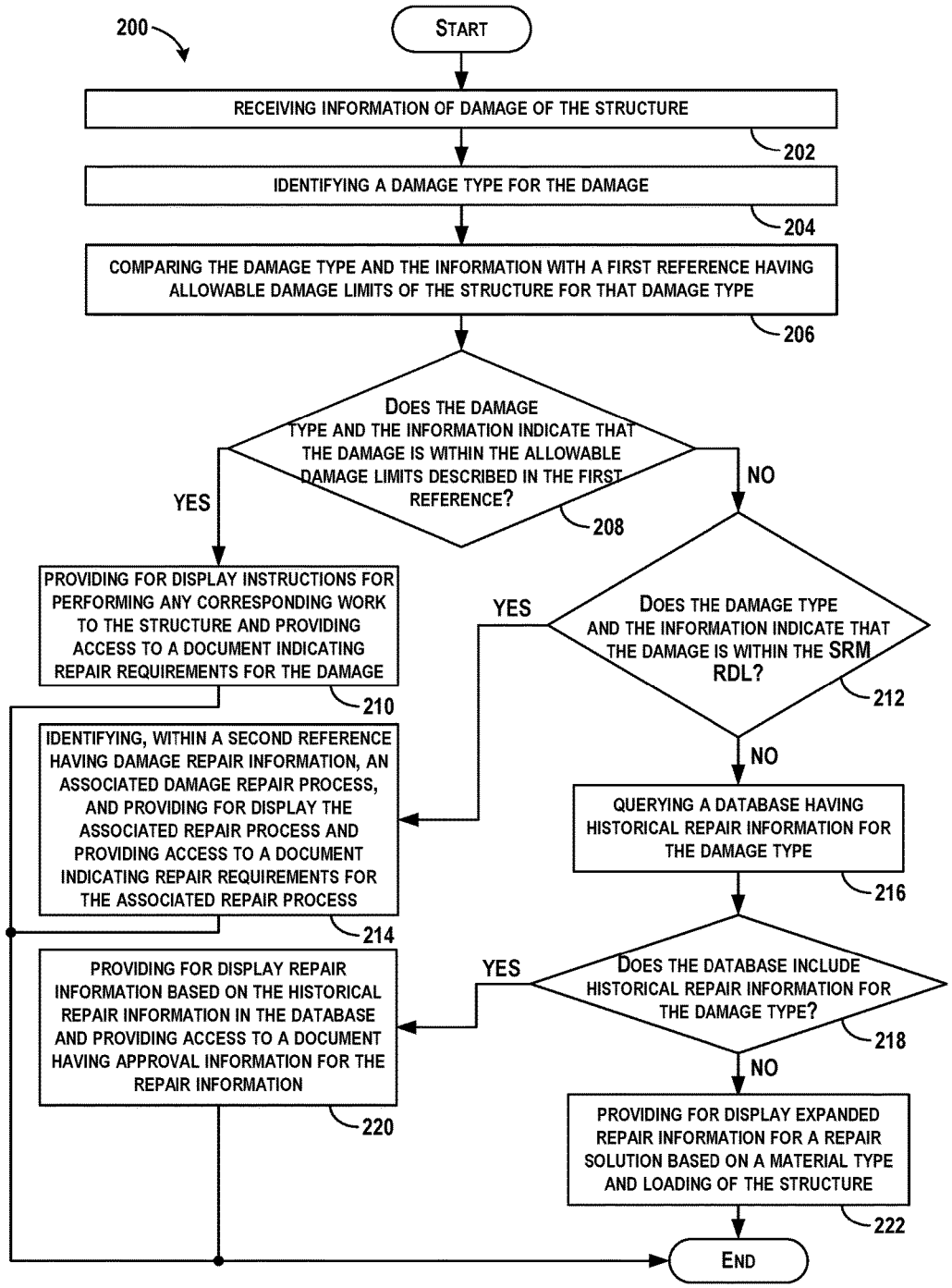
FIG. 5 shows a flowchart of an example computer-implemented method of assessing damage to a structure, according to an example embodiment.

FIG. 5 shows a flowchart of an example computer-implemented method 200 of assessing damage to a structure, according to an example embodiment. Method 200 shown in FIG. 5 presents an embodiment of a method that could be used with the arrangement 100 or system 126 shown in FIGS. 1-2, for example. Further, devices or systems may be used or configured to perform logical functions presented in FIG. 5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-222. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 5, and within other processes and methods disclosed herein, may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes receiving information of damage to the structure. At block 204, the method 200 includes identifying a damage type for the damage.

At block 206, the method 200 includes comparing the damage type and the information with a first reference having allowable damage limits of the structure for that damage type (e.g., reference having ADL 144).

At block 208, the method 200 includes determining if the damage type and the information indicating that the damage is within the allowable damage limits described in the first reference. If so, as shown at block 210, the method 200 includes providing for display instructions for performing any corresponding work to the structure and providing access to a document indicating repair requirements for the damage.

If the damage type and the information indicating that the damage is outside the allowable damage limits described in the first reference, the method 200 includes determining, within a second reference having damage repair information 146, an associated damage repair process as shown at block 212. If the second reference has an associated damage repair process, the method 200 includes providing for display the associated repair process and providing access to a document indicating repair requirements for the associated repair process, as shown at block 214.

If the damage type and the information indicating that the damage is outside the allowable damage limits described in the first reference and also does not have any associated damage repair process described in the second reference, the method 200 includes querying a database having historical repair information 150 for the damage type, as shown at block 216. The method 200 further includes, as shown at block 218, determining whether the database includes historical repair information for the damage type. If so, the method 200 includes providing for display repair information based on the historical repair information in the database and providing access to a document having approval information for the repair information, as shown at block 220.

If the database does not include historical repair information for the damage type, the method 200 includes providing for display expanded repair information 152 for a bonded repair solution based on a material type of the structure, as shown at block 222.

Figure 6:
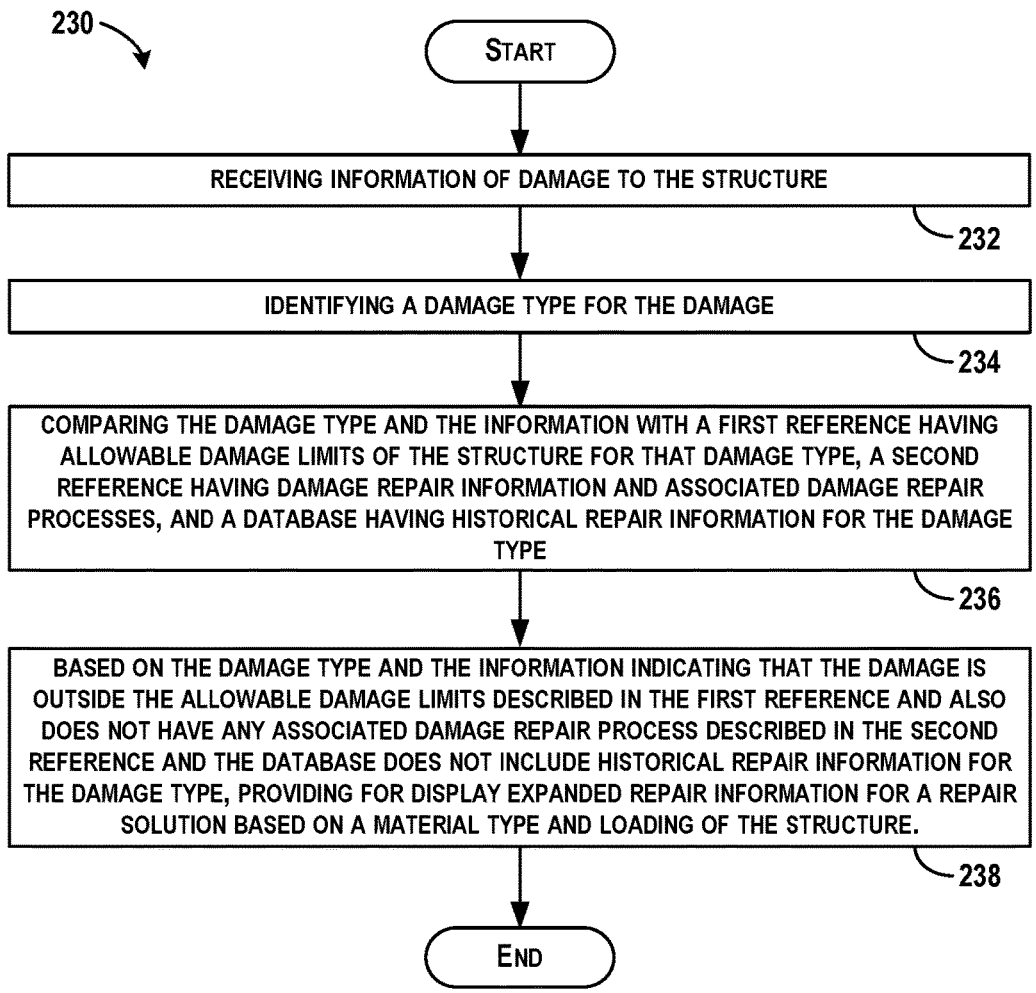
FIG. 6 shows a flowchart of an example computer-implemented method of assessing damage to a structure, according to an example embodiment.

FIG. 6 shows a flowchart of an example computer-implemented method 230 of assessing damage to a structure, according to an example embodiment. Method 230 shown in FIG. 6 presents an embodiment of a method that could be used with the arrangement 100 or system 126 shown in FIGS. 1-2, for example. Further, devices or systems may be used or configured to perform logical functions presented in FIG. 6. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 230 may include one or more operations, functions, or actions as illustrated by one or more of blocks 232-238. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. Each block may represent a module, a segment, or a portion of program code, which includes one or more instructions executable by a processor for implementing specific logical functions or steps in the process.

At block 232, the method 230 includes receiving information of damage to the structure. At block 234, the method 230 includes identifying a damage type for the damage. As one example of receiving information of damage and identifying the damage type, information can be received from the user interface 138 that can be used to identify and select a damage area of a structure. The user interface 138 can output, based on the da mage information input by the user, a model of the structure, and a list of damaged areas (which can include areas such as, but not limited to, structural, electrical, engines, hydraulics, avionics, flight controls, and cabins). The information can be provided directly by the user or the user interface 138 can access databases in the cloud 102 to determine the information based on inputs by the user.

In addition, the user may provide, or the user interface 138 may request, information as to a damage location on the model of the structure. The damage location can be input by the user selectively highlighting the location via the user interface 138 to facilitate graphically highlighting the damaged area.

The structure itself can be further identified by a structure type, which includes types such as, but not limited to, skins and stringers, frames, floor beams, intercostals, galley upper, galley floor, fittings, cargo floor, doors, and windows. In addition, the user can select a desired maintenance action for the structure, and maintenance action includes categories such as, but not limited to, allowable damage limit assessment, repairable damage limit assessment, temporary repairs, flight restricted repairs or maintenance actions, and permanent repairs of certain types such as bonded, bolted, scarf or overlay.

Similarly, the user can be provided a list of damage types, such as but not limited to, gouges and lightning strikes, displayed by the user interface 138, and the user interface 138 receives a select of a damage type. Additional details can be requested by the user interface 138 and provided by the user such as parameters of the damage including a length of damage, a width of damage 12 and a depth of damage. Based on selections made by the user, the user interface 138 determines the damage type and structure information to forward to the processor(s) 128.

At block 236, the method 230 includes comparing the damage type and the information with a first reference having allowable damage limits 144 of the structure for that damage type, a second reference having damage repair information 146 and associated damage repair processes, and a database having historical repair information 150 for the damage type.

At block 238, the method 230 includes based on the damage type and the information indicating that the damage is outside the allowable damage limits described in the first reference and also does not have any associated damage repair process described in the second reference and the database does not include historical repair information for the damage type, providing for display expanded repair information 152 for a repair solution based on a material type and loading of the structure. The loading of the structure can consider actual load placed on the specific structure, in contrast to set limits or defaults determined during testing and including in the references, for example.

Following, the method 230 includes displaying the expanded repair information for the bonded repair solution. The method 230 can also include providing access to a document having approval information for the repair information, such as providing federal aviation administration (FAA) documentation.

Figure 7:
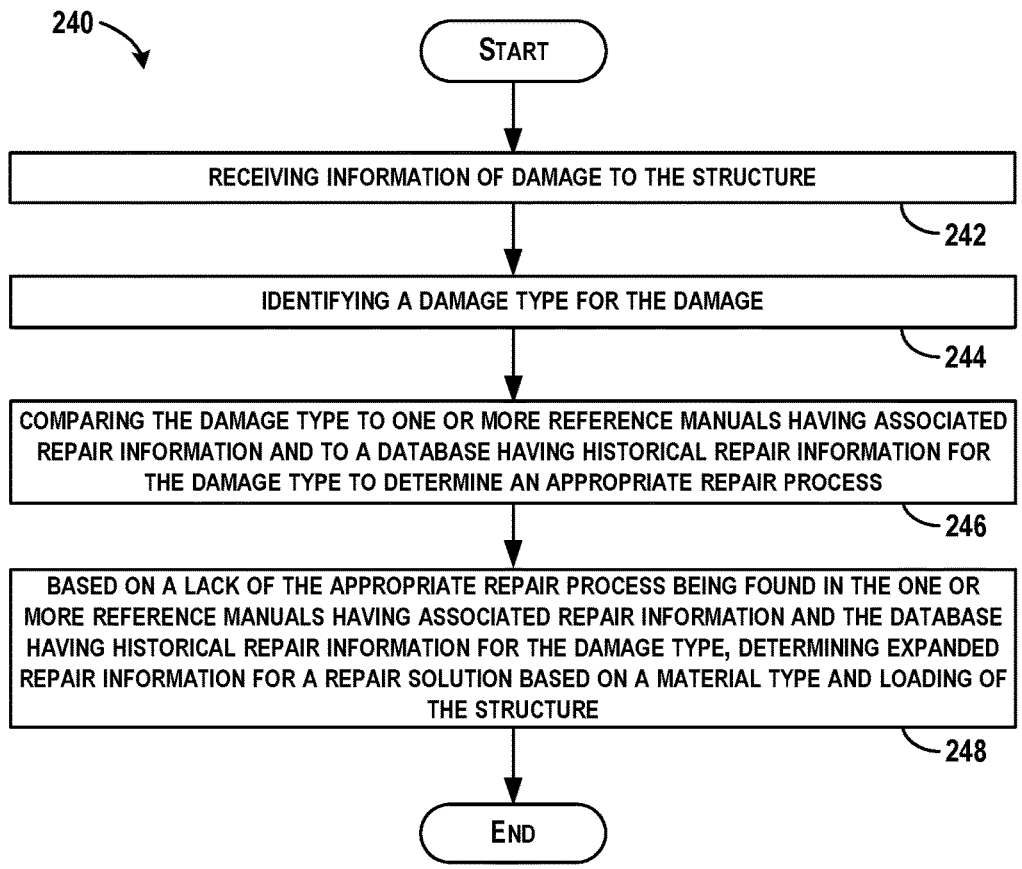
FIG. 7 shows a flowchart of an example computer-implemented method of assessing damage to a structure, according to an example embodiment.

FIG. 7 shows a flowchart of an example computer-implemented method 240 of assessing damage to a structure, according to an example embodiment. Method 240 shown in FIG. 7 presents an embodiment of a method that could be used with the arrangement 100 or system 126 shown in FIGS. 1-2, for example. Further, devices or systems may be used or configured to perform logical functions presented in FIG. 7. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 240 may include one or more operations, functions, or actions as illustrated by one or more of blocks 242-248. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. Each block may represent a module, a segment, or a portion of program code, which includes one or more instructions executable by a processor for implementing specific logical functions or steps in the process.

At block 242, the method 240 includes receiving information of damage to the structure. At block 244, the method 240 includes identifying a damage type for the damage. Information may be received from the user interface 138.

At block 246, the method 240 includes comparing the damage type to one or more reference manuals having associated repair information and to a database having historical repair information for the damage type to determine an appropriate repair process. The comparison can include comparing the damage type with a first reference having allowable damage limits of the structure for that damage type, and if the damage type indicates that the damage is outside the allowable damage limits described in the first reference, identifying, within a second reference having damage repair information, an associated damage repair process. Comparing with the first reference is performed to determine that the damage type requires no repair or a cosmetic repair, or that the damage type requires no substantial repair. Comparing with the second reference is performed to determine that the damage type has an associated predefined repair procedure by performing a look-up in a table for a pre-run repair solution corresponding to the damage type.

At block 248, the method 240 includes based on a lack of the appropriate repair process being found in the one or more reference manuals having associated repair information and the database having historical repair information for the damage type, determining expanded repair information for a repair solution based on a material type and loading of the structure. The method 240 also can include displaying the expanded repair information for the bonded repair solution, and/or providing access to federal aviation administration (FAA) documentation indicating requirements for repairs for the damage.

In the example method 230 shown in FIG. 6 and the method 240 shown in FIG. 7, the expanded repair information 152 is required. The comparison with the first reference having allowable damage limits 144 is performed to determine that the damage type requires no repair or a cosmetic repair or that the damage type requires no substantial repair. Information as to ADLs is acquired or accessed in the cloud and the allowable damage limits are compared to at least one parameter. A determination for a damage allowability is made and a maintenance response is displayed based on the determination. However, in these examples, the damage is outside the ADL.

In addition, the comparison with the second reference having damage repair information 146 is performed to determine that the damage type has an associated predefined repair procedure, by performing a look-up in a table for a pre-run repair solution corresponding to the damage type. However, in these examples, the damage does not have an associated predefined repair procedure.

Figure 8:
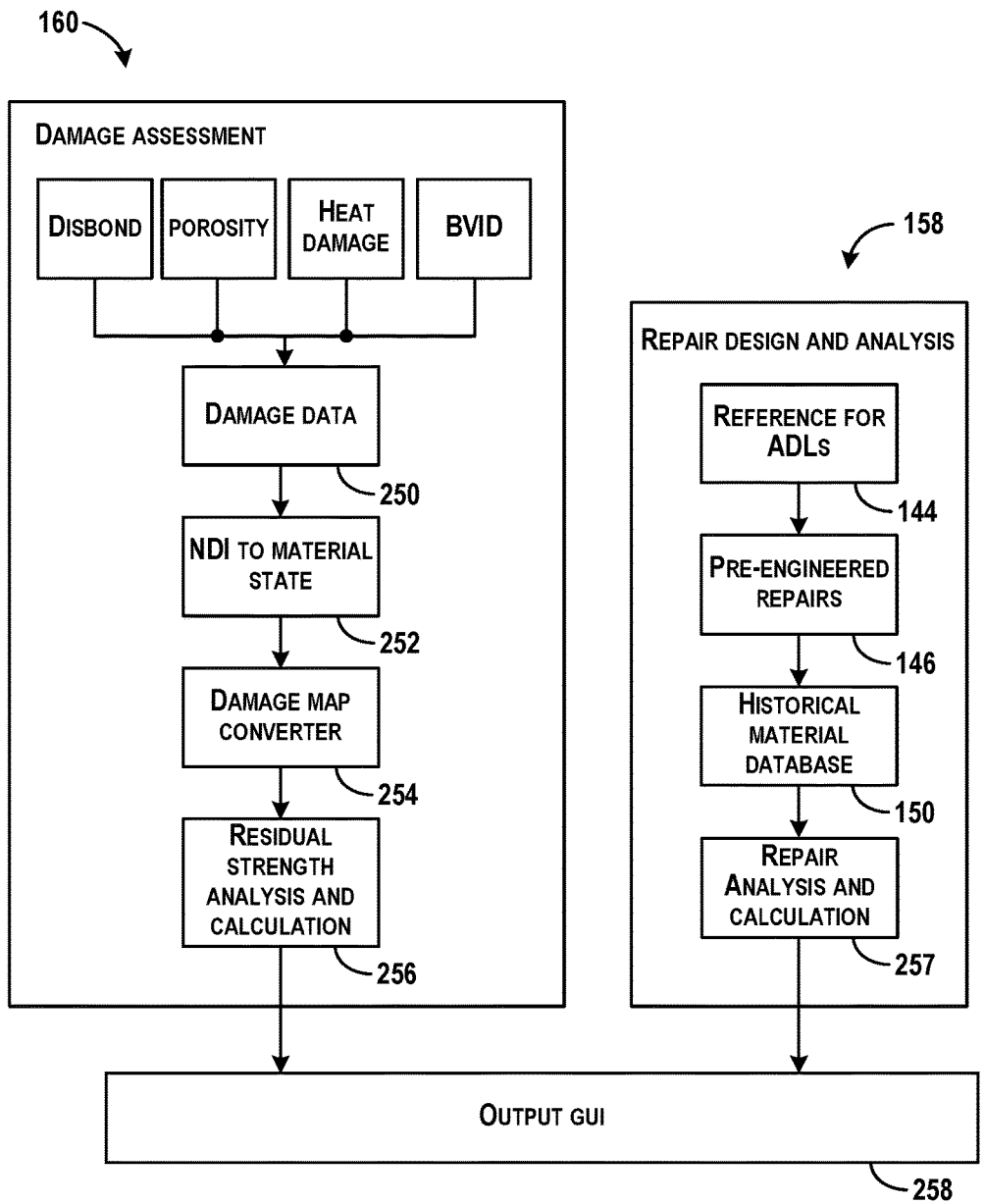
FIG. 8 is a flow diagram of functions performed by the system to determine the expanded repair information, according to an example embodiment.

FIG. 8 is a flow diagram of functions performed by the system 126 to determine the expanded repair information 152, according to an example embodiment. The expanded repair information 152 enables determination of a solution in real time, rather than sending the damage information or the damaged part to the part manufacturer to identify a repair solution.

The damage assessment module 160 performs damage assessment for a number of procedures and some examples include damage types such as disbond, porosity, heat damage, barely visible impact damage (BVID), a surface scratch, a nick, gouge, and dent, an impact heat damage, a cut-out and free edge delamination, a post-repair defect (e.g., for all bonded repairs with defects at an arbitrary bondline location), corrosion grind-outs, and general non-destructive investigation (NDI) detectable damages. The damage type is input as damage data 250 and NDI to material state and a damage map converter are performed, as shown at blocks 252 and 254, to map a state of the material into an analysis model. A residual strength analysis and calculation is performed, at block 256, to determine the strength of the damaged part. Outputs are provided to the GUI, at block 258.

The repair design and analysis module 158 can determine features for determining expanded repair information by accessing the reference for ADLs 144, the reference for damage repair information 146, and the database of historical repair information 150 to identify a similar damage type so as to map the current damage to a known repair process. This can be useful as starting point.

Then, a specific repair produce can be identified. As an example, a bonded overlay or external repairs of solid or sandwich laminates may be appropriate for the damage type. A repair of elliptical (and circular) damage with an elliptical patch is used to maintain margin safety checks for the patch and skin laminates based on stress and strain distribution around the patch edge and damage edge including elliptical patch and elliptical hole.

As another example, a scarf joint method (SJM) may be used to perform a bondline analysis (e.g., strength and damage tolerance) of a scarf or multiple step joint/repair design to determine peel and shear coupling and disbond/delamination.

As another example, existing closed-form methods in composite repair of aircraft structures (CRAS) can be expanded, modularized, and used to design and analyze composite patches on metallic structures. Patch parameters are entered to calculate an acceptable patch design, and different types of damage can be repaired using this procedure including cracks, corrosion grind-outs, holes with grind-outs, holes, dents, and cutouts. Example input parameters include a patch design (e.g., non-elliptical patch, patch over crack, or a corrosion repair), and an analysis capability (e.g., load attraction, crack-tip stress intensity, damage tolerance, out-of-plane bending, disbond effect, proximity effect, and thermal effect).

As another example, a fail-safe method for bonded repair can be used for bonded repairs that are often desirable due to better fit and finish. A damaged structure may be required to have limit load strength in a case of catastrophic repair failure.

In these examples, the damage for which a repair process is unknown, or a pre-run solution does not exist, can be compared to other damage types for which pre-run solutions do exist, and when the comparison is within a tolerance level, the pre-run solution can be applied to the damage having an unknown repair process as expanded repair information. The tolerances depend on material type, type of structure, type of damage, type of repair process, etc. A benefit of using this procedure is that if a pre-run solution can be applied to a damage type, then FAA approval documentation can also be provided more quickly to enable damage disposition to occur in a shortened time period so that the repairs can be performed more quickly as well.

In some examples, the expanded repair information 152 can use any of the procedures above, which may be performed by running simulations to determine a best repair procedure for selection to use, when a pre-run solution is unknown for a repair analysis and calculation 257.

Figure 9:
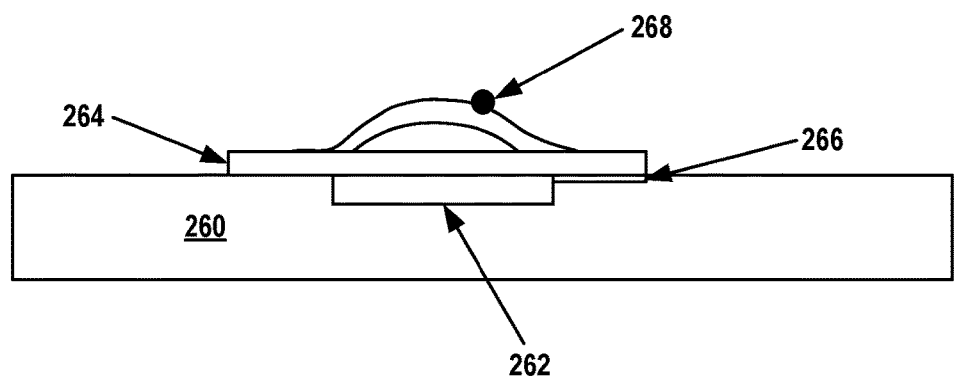
FIG. 9 illustrates an example structure that has damage for repair, according to an example embodiment.

FIG. 9 illustrates an example structure 260 that has damage 262 for repair, according to an example embodiment. In FIG. 9, the structure 260 is a skin overlay for an aircraft. The structure 260 has been damaged by a dent or gouge. To repair, a patch 264 is bonded using composite bonding techniques. In this example, the repair procedure may not be included in the reference having ADLs 144, the reference having damage repair information 146, or in the database of historical repair information 150, and so expanded repair information 152 will be accessed. Damage having a similar size, location, and properties as the damage 262 can be searched within the reference having ADLs 144, the reference having damage repair information 146, or in the database of historical repair information 150 for the same type of structure 260. Once any similarities are found, further evaluation of the patch 264 repair process can be performed. For example, composite bonding includes bondlines 266, which can fail when bonding to different material types. Further, patch repairs can result in unsupported patch buckling 268 when bonding to different material types. Thus, composite bonding techniques can be matched against the material type of the structure 260 to ensure that composite bonding will not fail. Once confirmed, the patch repair process can be provided as the expanded repair information 152.

Although examples described herein relate to structures on an aircraft, systems and methods described herein may be applied to maintenance, manufacture, and assembly of other vehicles, and any other types of structures on components as well.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of assessing damage to a structure, the method comprising:
   receiving information of damage to the structure;
   identifying a damage type for the damage;
   comparing the damage type and the information with a first reference having allowable damage limits of the structure for that damage type, a second reference having damage repair information and associated damage repair processes, and a database having historical repair information for the damage type;
   determining whether the allowable damage limits of the structure for the damage type are above the allowable damage limits described by the first reference but still meet damage tolerance requirements for the damage type,
   if so, providing a repair per the damage repair information and associated damage repair processes described in the second reference,
   otherwise, based on the damage type and the information indicating that the damage is outside the allowable damage limits described in the first reference and also does not have any associated damage repair process described in the second reference and the database does not include historical repair information for the damage type, providing for display expanded repair information for a repair solution based on a material type and loading of the structure.

2. The computer-implemented method of claim 1, wherein receiving information of damage to the structure comprises receiving the information from a user interface.

3. The computer-implemented method of claim 1, wherein the method is performed by a system having one or more processors, and the method further comprises:
   displaying the expanded repair information for the repair solution.

4. The computer-implemented method of claim 1, further comprising providing access to a document having approval information for the repair information.

5. The computer-implemented method of claim 4, wherein providing access to the document having approval information for the repair information comprises providing federal aviation administration (FAA) documentation.

6. The computer-implemented method of claim 1, wherein comparing the damage type and the information with the first reference having allowable damage limits of the structure for that damage type comprises:
   determining that the damage type requires no repair or a cosmetic repair.

7. The computer-implemented method of claim 1, wherein comparing the damage type and the information with the first reference having allowable damage limits of the structure for that damage type comprises:
   determining that the damage type requires no substantial repair.

8. The computer-implemented method of claim 1, wherein comparing the damage type and the information with the second reference having damage repair information and associated damage repair processes comprises:
   determining that the damage type has an associated predefined repair procedure.

9. The computer-implemented method of claim 8, wherein determining that the damage type has the associated predefined repair procedure comprises:
   performing a look-up in a table for a pre-run repair solution corresponding to the damage type.

10. The computer-implemented method of claim 1, further comprising:
    determining a type of material of the structure;
    determining whether a repair can be performed to meet the damage tolerance requirements; and
    if not, determining a non-bonded repair solution.

11. The computer-implemented method of claim 1, further comprising:
    determining a type of material of the structure;
    determining whether a repair can be performed to meet the damage tolerance requirements;
    if so, determining whether the repair meets fail-safe requirements, and
    if not, determining a non-bonded repair solution.

12. The computer-implemented method of claim 1, further comprising:
- determining a type of material of the structure;
- determining whether a repair can be performed to meet the damage tolerance requirements;
  - if so, determining whether the repair meets fail-safe requirements, and
  - if so, determining a bonded repair solution.

13. The computer-implemented method of claim 1, further comprising:
- attempting to identify a bonded repair solution for the damage type based on the damage type being within a size limit.

14. The computer-implemented method of claim 1, further comprising:
- attempting to identify a bonded repair solution for the damage type based on the structure not being exposed to temperatures above a threshold.

15. A system comprising:
- one or more processors; and
- non-transitory data storage storing instructions, that when executed by the one or more processors, causes the one or more processors to perform functions comprising:
  - receiving information of damage to a structure;
  - identifying a damage type for the damage;
  - comparing the damage type and the information with a first reference having allowable damage limits of the structure for that damage type, a second reference having damage repair information and associated damage repair processes, and a database having historical repair information for the damage type;
  - determining whether the allowable damage limits of the structure for the damage type are above the allowable damage limits described by the first reference but still meet damage tolerance requirements for the damage type,
    - if so, providing a repair per the damage repair information and associated damage repair processes described in the second reference,
  - otherwise, based on the damage type and the information indicating that the damage is outside the allowable damage limits described in the first reference and also does not have any associated damage repair process described in the second reference and the database does not include historical repair information for the damage type, providing for display expanded repair information for a repair solution based on a material type and loading of the structure.

16. The system of claim 15, further comprising:
- a communication interface enabling a subscription to the system and to receive the information of damage to the structure from an authorized subscriber.

17. The system of claim 15, further comprising:
- a user interface for receiving the information of damage to the structure.

18. The system of claim 15, further comprising:
- a display for displaying the expanded repair information for the repair solution.

19. The system of claim 15, wherein the functions further comprise:
- providing access to a document having approval information for the repair information.

20. The system of claim 19, wherein providing access to the document having approval information for the repair information comprises providing federal aviation administration (FAA) documentation.

* * * * *